A. R. R. SEIFERT, DEC'D.
B. CAMPBELL, ADMINISTRATRIX.
ANT TRAP.
APPLICATION FILED JUNE 13, 1911.

1,012,571. Patented Dec. 19, 1911.

WITNESSES:
Samuel E. Wade
Perry B. Turpin

INVENTOR
BERTHA CAMPBELL
ADMINISTRATRIX OF ESTATE OF
ADOLPH R. R. SEIFERT, DECEASED
BY Munn & Co.
ATTORNEYS

COLUMBIA PLANOGRAPH CO., WASHINGTON, D. C.

UNITED STATES PATENT OFFICE.

ADOLPH R. R. SEIFERT, DECEASED, LATE OF BRENHAM, TEXAS, BY BERTHA CAMPBELL, ADMINISTRATRIX, OF BRENHAM, TEXAS, ASSIGNOR OF ONE-HALF TO JAKE GACKENHEIMER, OF BRENHAM, TEXAS.

ANT-TRAP.

1,012,571.      Specification of Letters Patent.      Patented Dec. 19, 1911.

Application filed June 13, 1911. Serial No. 632,983.

*To all whom it may concern:*

Be it known that I, BERTHA CAMPBELL, a citizen of the United States, residing at Brenham, in the county of Washington and State of Texas, have been appointed administratrix of the estate of ADOLPH R. R. SEIFERT, deceased, who during his lifetime invented certain new and useful Improvements in Ant-Traps, of which the following is a specification.

This invention is an improvement in ant traps and has for an object to provide a novel construction including a body portion having upper and lower inlet chambers, and a trap connected with the upper inlet chamber by a passage-way through which the ants may conveniently pass; and the invention consists in certain novel constructions and combinations of parts as will be hereinafter described and claimed.

Figure 1:
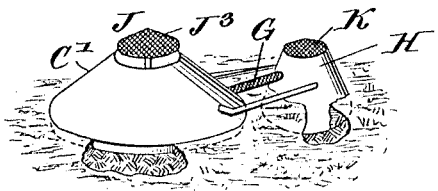
Figure 2:
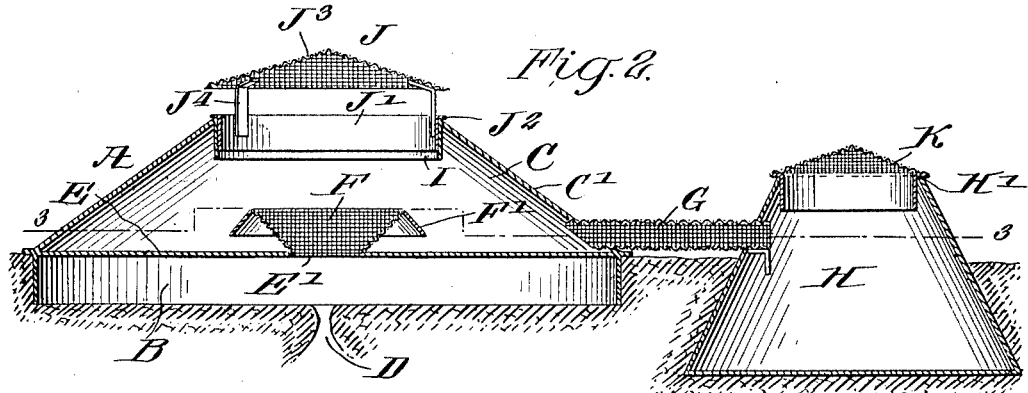
Figure 3:
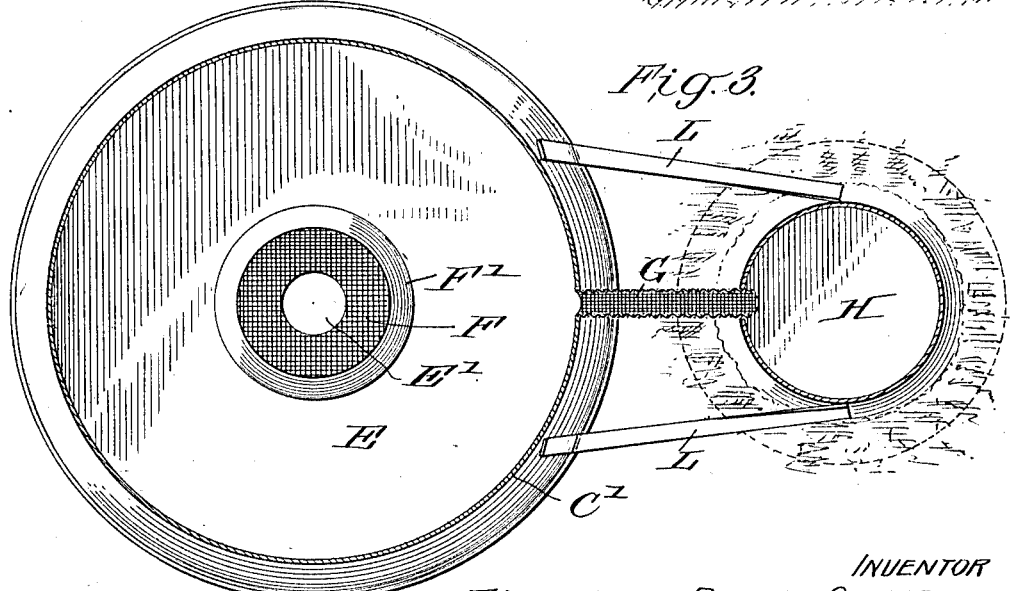
Figure 4:
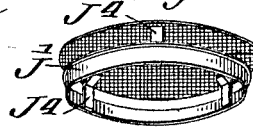

In the drawing Figure 1 is a perspective view of the trap in place. Fig. 2 is a vertical section thereof, Fig. 3 is a horizontal section on about line 3—3 of Fig. 2. Fig. 4 is a detail perspective view of the removable top for the body portion.

As shown the body portion A comprises a lower entrance chamber B and an upper entrance chamber C, the latter having sloping sides C' which usually are covered with sand, in the use of the invention. The chamber B is open at the bottom and is adapted to be placed right over the ant hill, the opening D from which leads into the chamber B and the chambers B and C are separated by a plate E having a central opening E' leading from the chamber B to the chamber C and through which opening the ants may pass from the chamber B to the chamber C, the opening E' being surrounded by an outwardly flaring hood which may preferably be of wire screen and has at its outer edge a depending skirt-like portion F', which may be of tin or other suitable metal and down which the ants may pass into the bottom portion of the chamber C or on to the plate E, whence they can pass through the foraminous passage-way G into the trap H, which trap H may be partly sunken in the ground in use and projects below the level of the passage G, as shown in Fig. 1. The body portion A has the top opening surrounded by the tube I in which fits the band J' at the lower end of the top J, said band J' fitting into the tube I and being flanged at J² to rest upon the said tube and the wire screen top J³ being supported by uprights J⁴ from the band J', affording light within the upper chamber C of the body portion. The trap H also has a top opening at H' in which is fitted the top or cover K, both said tops J and K being removable whenever desired. Bracing bars L extend between the body portion A and the trap and reinforce and strengthen the device in the use of the invention.

It will be noticed that the trap proper H flares outwardly toward its lower end so that it secures a firm anchorage in the ground and this trap proper is provided with a removable cover K which is foraminous and lights and ventilates the trap proper and permits the convenient access to the trap proper without displacing either the trap proper or the body portion which is connected therewith, this being advantageous when it is desired to remove the trapped ants from the trap. It will also be noticed that the top J of the body portion is spaced by the uprights J⁴ in such manner as to afford ample ventilation and light to attract the ants upwardly into the upper chamber whence they may pass through the passage-way G into the trap proper as before described.

What is claimed is:

The ant trap herein described comprising a body portion having upper and lower chambers and a passage communicating the same and the said body portion being provided with a removable top whose cover portion is spaced above the body portion, a tubular passage-way extending laterally from the body portion, a trap proper to which the passage-way discharges, the said trap proper being flared outwardly toward its lower end, and a removable foraminous cover for said trap proper, the tubular passage-way being foraminous, all substantially as and for the purposes set forth.

BERTHA CAMPBELL,
*Administratrix of the estate of Adolph R. R. Seifert.*

Witnesses:
   CHAS. KRAUSE,
   O. L. EDDINS.

---

Copies of this patent may be obtained for five cents each, by addressing the "Commissioner of Patents, Washington, D. C."